United States Patent [19]

Herrick et al.

[11] Patent Number: 5,778,222
[45] Date of Patent: Jul. 7, 1998

[54] METHOD AND SYSTEM FOR MANAGING ACCESS TO OBJECTS

[75] Inventors: Thomas R. Herrick; Scott A. Lenharth; Syed A. Wadood, all of Austin, Tex.

[73] Assignee: International Business Machines Corporation, Armonk, N.Y.

[21] Appl. No.: 891,367

[22] Filed: Jul. 10, 1997

Related U.S. Application Data

[63] Continuation of Ser. No. 266,083, Jun. 27, 1994, abandoned.
[51] Int. Cl.$^6$ ....................................... G06F 17/30
[52] U.S. Cl. .......................... 395/609; 395/614; 395/615
[58] Field of Search ...................................... 395/609, 614, 395/615

[56] References Cited

U.S. PATENT DOCUMENTS

| | | | |
|---|---|---|---|
| 5,057,996 | 10/1991 | Cutler et al. | 395/676 |
| 5,315,657 | 5/1994 | Abadi et al. | 380/25 |
| 5,321,841 | 6/1994 | East et al. | 395/677 |
| 5,335,346 | 8/1994 | Fabbio | 395/600 |
| 5,423,034 | 6/1995 | Cohen-Levy et al. | 395/610 |
| 5,568,639 | 10/1996 | Wilcox et al. | 395/616 |
| 5,584,022 | 12/1996 | Kikuchi et al. | 395/609 |

OTHER PUBLICATIONS

Sandhu et al, "Non–Monotonic Transformation of Access Rights", Proc. 1992 IEEE Computer Society Symposium on Research in Security and Privacy, 4–6 May 1992, pp. 148–161.

Bacon et al. "Access Control for a Modular, Extensible Storage Service", PROC. First International Workshop on Services in Distributed and Networked Environments, IEEE Computer Society Press, 27–28 Jun. 1994, pp. 108–114.

Twiddle et al, "Domain Based Configuration and Name Management for Distributed Systems", Workshop on the Future Trends of Distributed Computing Systems in the 1990s, 14–16 Sep. 1988, pp. 147–153.

Yu, "Access Control and Authorization Plan for Customer Control of Network Services", Globecom '89:IEEE Global Telecommunications Conf. 27–30 Nov. 89, pp. 862–869 vol. 2.

Yu, "An Authorization Plan for Commerical Service Systems", PROC of the Sixth Annual Security Applications Conf., 3–7 Dec. 1990, pp. 376–383.

R. J. Bamford, et al., "Access Control For a Shared Data Base", IBM Technical Disclosure Bulletin, vol. 23 No. 4, Sep. 1990, pp. 1638–1639.

"Method To Manage Access Control of Multiple Lan Server 1.2 and 1.3 Resources With a Single OS/2 Command", IBM Technical Disclosure Bulletin, vol. 34 No. 11, Apr. 1992, pp. 167–168.

"Transparent Access To Local or Remote I/O Via Various Channels and/or Links", IBM Technical Disclosure Bulletin, vol. 31 No. 6, Nov. 1988, pp. 220–227.

"Verification and Access Control in an Object–Oriented System", IBM Technical Disclosure Bulletin, vol. 34 No. 4A, Sep. 1991, pp. 300–302.

(List continued on next page.)

*Primary Examiner*—Wayne Amsbury
*Attorney, Agent, or Firm*—Jeffrey S. LaBaw; Duke W. Yee; Andrew J. Dillon

[57] ABSTRACT

A method and a system for managing access to a plurality of objects located on levels within a hierarchical structure in a data processing system. A first object within the plurality of objects is located. An operation is selected to after access to selected objects within the plurality of objects, wherein the selected operation excludes altering access to directories located in said hierarchical structure on levels below the first directory to match that of the first directory. Then, the selected operation is performed on objects located in on levels below the first object wherein access to the plurality of objects may be managed.

32 Claims, 6 Drawing Sheets

OTHER PUBLICATIONS

"Handling Local Administrated Media Access Control Addresses in LAN Interconnect", IBM Technical Disclosure Bulletin, vol. 36 No. 04, Apr. 1993 pp. 185–188.

"Communication Protocol on Virtual Link", IBM Technical Disclosure Bulletin, vol. 28 No. 8, Jan. 1986, pp. 3312–3314.

M. Ebrahimi, J. Marberg, K. Perry, R. Summers and U. Zernik, "File Name Mapping Method Permitting Network Location Transparency", IBM Technical Disclosure Bulletin, vol. 26 No. 7B, Dec. 1983, pp. 3791–3794.

Multiprocessing System Memory Access Queue and Scheduling Apparatus, IBM Technical Disclosure Bulletin, vol. 34 No. 12, May 1992, pp. 299–300.

W.G. Howe, D. P. Karp, R.C. Larson, D.B. McKay and A.J. Shils, "User Node Interface", IBM Technical Disclosure Bulletin, vol. 33 No. 11, Apr. 1991, pp. 2787–2788.

"Access Authorization For Cache Coherence Control", IBM Technical Disclosure Bulletin, vol. 33 No. 11, Apr. 1991, pp. 306–307.

METHOD AND SYSTEM FOR MANAGING ACCESS TO OBJECTS

This is a Continuation of application Ser. No. 08/266,083, filed Jun. 27, 1994, abandoned.

BACKGROUND OF THE INVENTION

1. Technical Field

The present invention relates in general to a method in a data processing system for managing data in the data processing system, and in particular, to a method and system for managing access to objects in a data processing system. Still more particularly, the present invention relates to a method and system for efficiently managing access to directories organized in a hierarchical structure in a data processing system.

2. Description of the Related Art

Data may be manipulated in many ways in a modern state-of-the-art data processing system including: data accessing, data encoding, data communications, data compression, data conversion, data entry, data exchange, data filing, data linking, data locking, data manipulation, data mapping, data modeling, etc. The large amounts of data that are available to the user of a modern state-of-the-art data processing system often become overwhelming in magnitude and complexity. These situations often may arise in the creation and execution of documents in a graphic user interface (GUI) employing windows.

With the large amounts of data available located in a data processing system and the number of users that may access data in the data processing system, it is often desirable to limit access to certain storage devices, directories, or files within the data processing system to prevent unauthorized use of sensitive data or to prevent damage to the data processing system through inadvertent alteration or deletion of data or other files.

One system used to manage access to data in a data processing system is a file system that employs access control lists (ACLs) to identify what users may access an object, such as a file or directory, and to identify the type of access that a user has for the particular object. A network manager or system operator may alter an access control list (ACL) to change what a user may have access to and the type of access available. Presently, in such a system using hierarchical directories, a network manager or system operator must directly alter access to each directory. Thus, if access to a number of related directories needs to be altered, access to each directory must be changed individually. In a hierarchical file system, directories below a parent directory may have all previous ACLs replaced with that from the parent directory. The parent directory is the directory that is selected for the modification in such a situation. Such a system can be time consuming and inefficient. Therefore, it would be advantageous to have a method and system for efficiently managing an ACL.

SUMMARY OF THE INVENTION

It is therefore one object of the present invention to provide an improved method and system for managing data in a data processing system.

It is another object of the present invention to provide a method and system for managing access to objects in a data processing system.

It is yet another object of the present invention to provide a method and system for managing access to directories organized in a hierarchical structure in a data processing system.

The present invention provides a method and a system for managing access to a plurality of objects located on levels within a hierarchical structure in a data processing system. A first object within the plurality of objects is located. An operation is selected to alter access to selected objects within the plurality of objects, wherein the selected operation excludes altering access to directories located in said hierarchical structure on levels below the first directory to match that of the first directory. Then, the selected operation is performed on objects located in on levels below the first object wherein access to the plurality of objects may be managed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
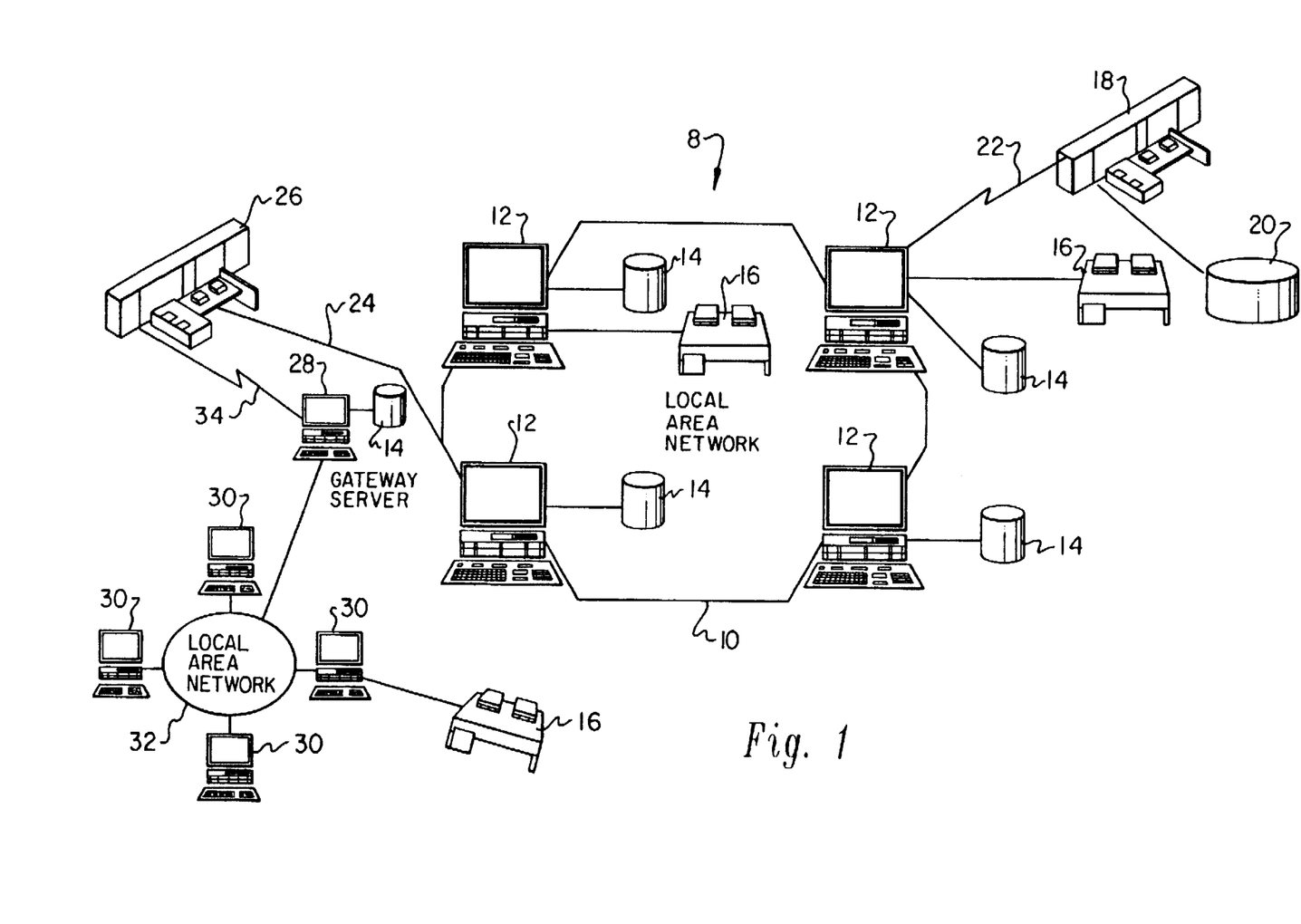
FIG. 1 is a pictorial representation of a data processing system, which may be utilized to implement the method and system of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/ 6000" is a trademark of International Business Machines Corporation. "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2A:
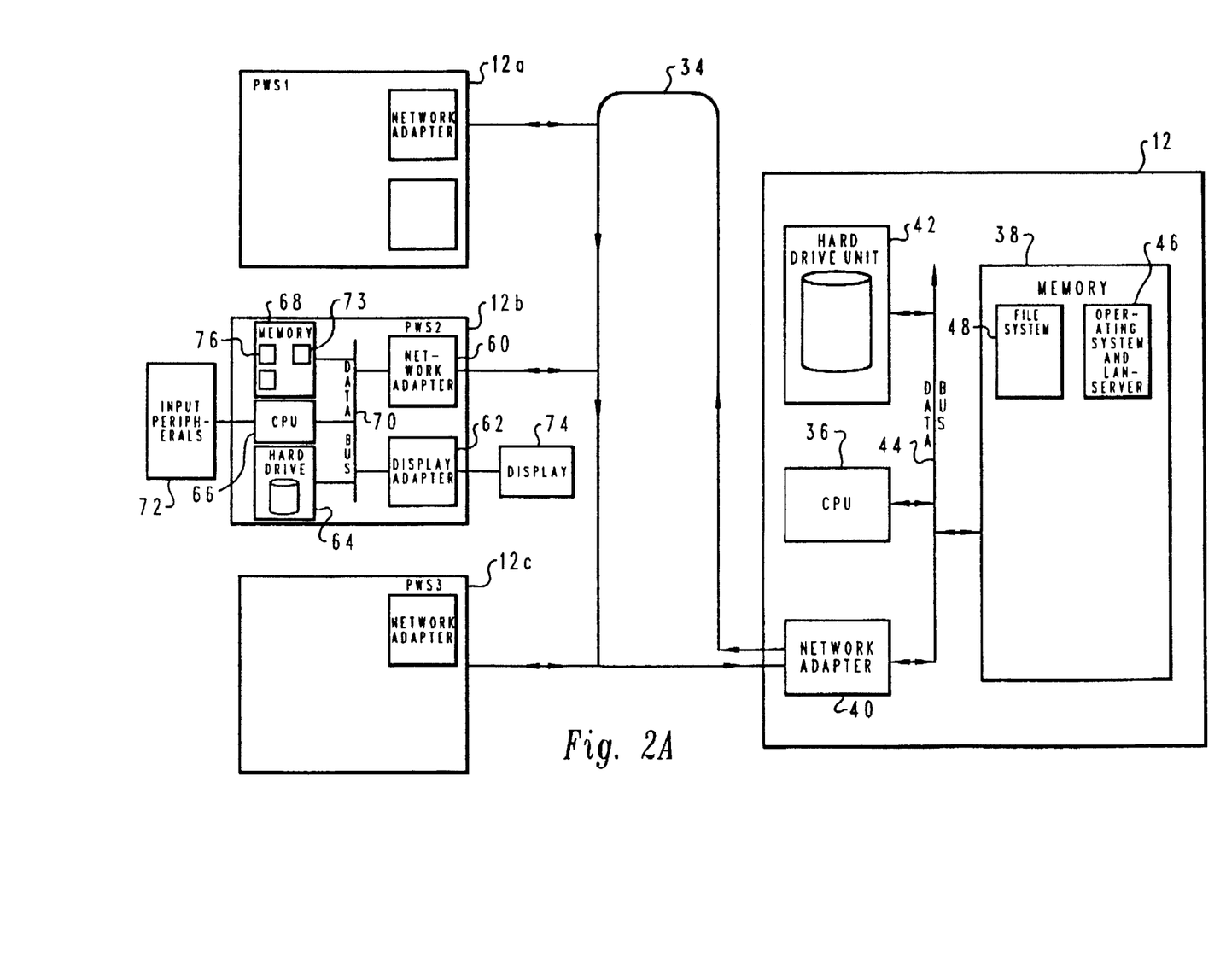
FIG. 2A depicts a block diagram of a Local Area Network from the data processing system illustrated in FIG. 1 for implementing the method and system of the present invention.

A preferred embodiment of the present invention may be incorporated within various computers depicted within data processing system 8. Referring now to FIG. 2A, a block diagram of LAN 10 is depicted for implementing a method and system of the present invention. Server 12 communicates with computers 12a–12c over communications channel 34. LAN 10 is depicted in a token ring geometry, however, other geometries are possible. Server 12 may be a conventional computer, such as an IBM PS/2 or AS/400 system programmed to practice this invention. Server 12 includes a central processing unit (CPU) 36, a memory 38, and a network adapter 40. Network adapter 40 is utilized for formatting outgoing transmissions and for deformatting incoming transmissions. Server 12 also includes a hard drive unit 42 for storing various objects, such as data files or executable code. Objects may be accessed by one or more users, wherein an object may be transferred to computer memory 38 over data bus 44. A number of objects may exist within memory 38. An operating system and local area network server 46 are represented as one object within memory 38.

Various users may access objects by sending a request to file system 48 in server 12 utilizing computers 12a–12c. A "file system" is a collection of files and file management structures that may be located in memory or on a physical or logical mass storage device. Computer 12b is a typical example. computer 12b operates as a personal work station communicating with server 12. Schematically, computer 12b is substantially similar to server 12, and includes a network adapter 60, a display adapter 62, a hard drive unit 64, a central processing unit (CPU) 66, and addressable memory 68. Components of computer 12b transfer data over data bus 70. CPU 66 directly controls input peripherals 72, which may include a keyboard and a mouse. Display adapter 62 drives display device 74. Memory 68 includes operating system 73. Memory 68 also includes object 76, which was supplied by computer 12 in response to a request to computer 12.

Figure 2B:
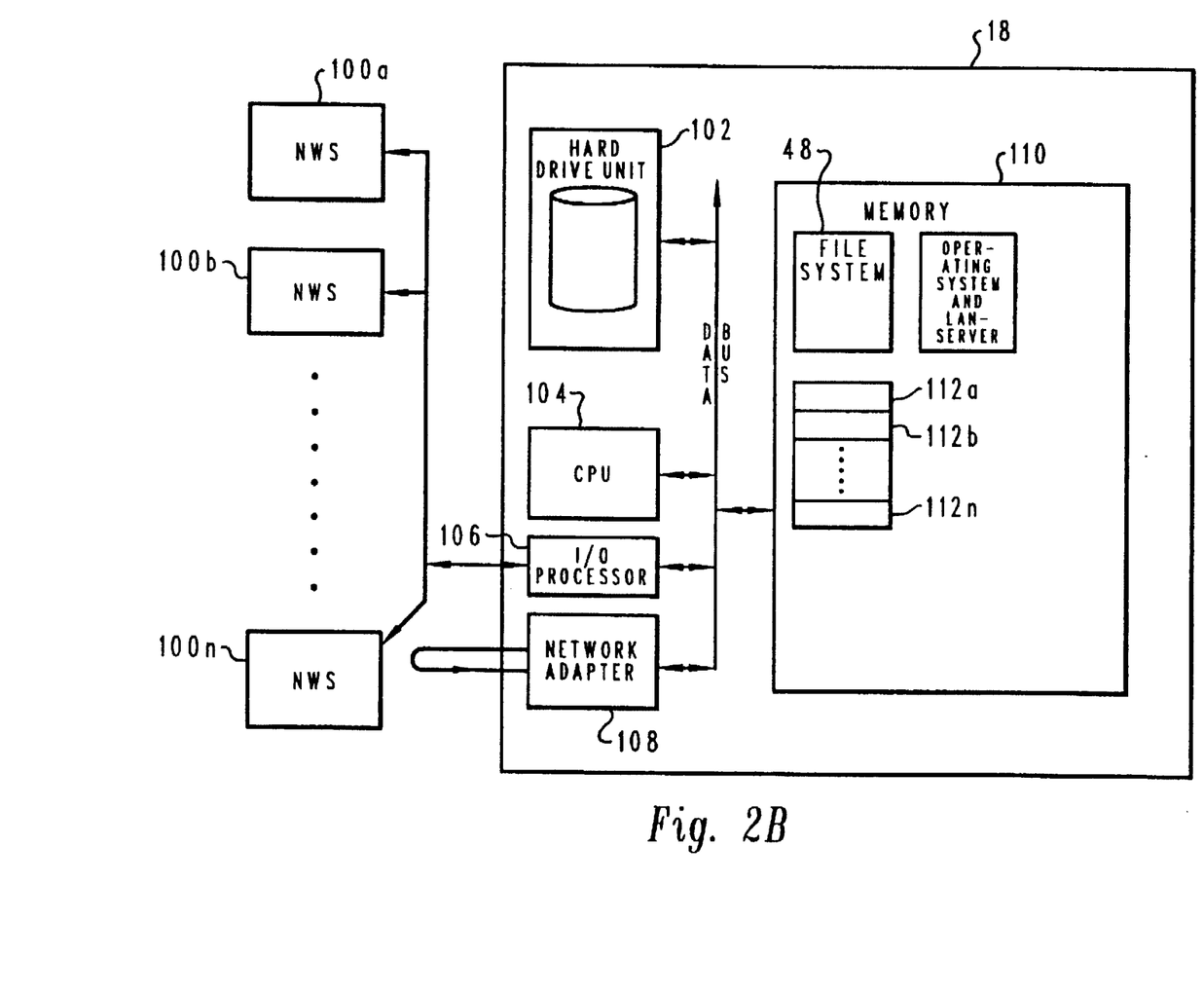
FIG. 2B depicts a block diagram of a mainframe computer from FIG. 1 for implementing the method and system of the present invention.

Referring now to FIG. 2B, a block diagram of mainframe computer 18 is depicted in accordance with a preferred embodiment of the present invention. Mainframe computer 18 is a single computer system running multiple processes, such as an IBM ESA/370 or ESA/390 attached to multiple nonprogrammable work stations (NWS) 100a–100n. Mainframe computer 18 includes a hard drive unit 102, CPU 104, input/output (I/O) processor 106 for communicating with nonprogrammable work stations 100a–100n, network adapter 108, and memory 110. Hard drive unit 102 may store objects. Each nonprogrammable work station may access an object within memory 110 or hard drive unit 102. For example, nonprogrammable work station 100a would access object 112a, nonprogrammable work station 100b would access object 112b, and nonprogrammable work station 100n would access object 112n in accordance with a preferred embodiment of the present invention.

An "object" is any real resource that has an ACL associated with it. In the depicted example, an "object" corresponds to a subdirectory or a file in a hierarchical file system. The "attributes" of an object are represented in an access control list (ACL). A "container object" is an entity that may contain zero or more objects or container objects. In the depicted example, a container corresponds to a directory in a hierarchical file system.

Figure 3:
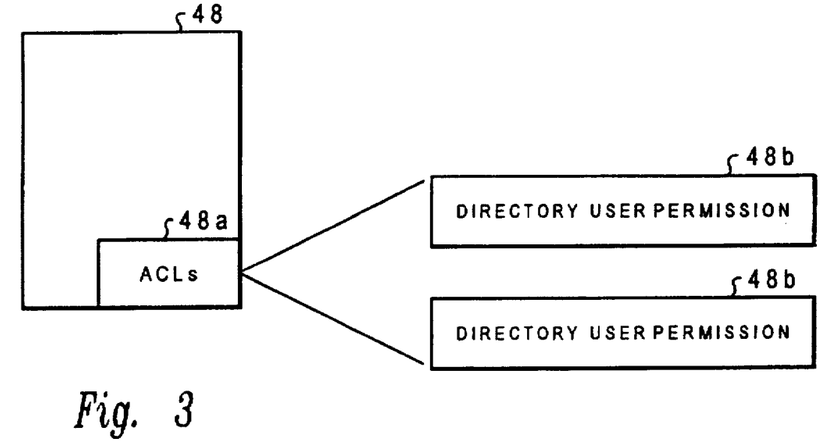
FIG. 3 is a block diagram of a file system including ACLs and object permissions.

With reference to FIG. 3, file system 48 located in the memory of server 12 or main frame computer 18 includes ACLs 48a. As can be seen, each ACL 48b includes a directory, a user and a permission. An ACL is a list of users and their permissions to an object or container object. Users may be combined into a group and inherit their permissions through the group rather than explicitly by a user. Various types of permissions may be granted to a user directly or through a group, such as, for example, delete (may delete object), none (no permission to object), execute (may execute object), read (may read object), write (may change object), create (may create new objects), permissions (may change ACL of object), and attributes (may change attributes other than ACL). An ACL may be associated with each directory, parent directory, or root directory on a hard drive.

Figure 4A:
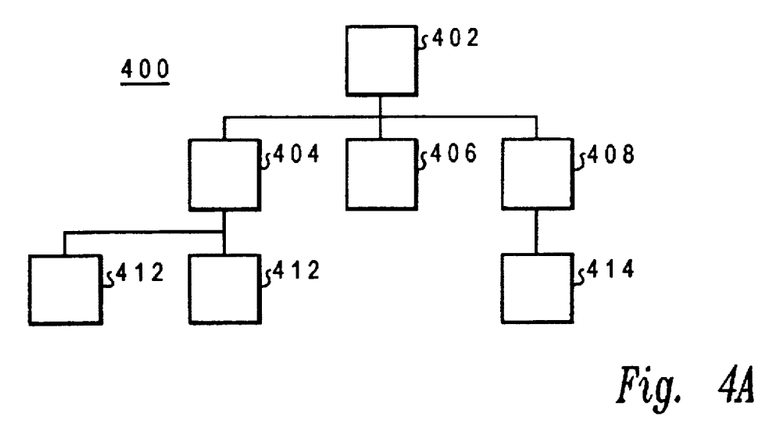
FIGS. 4A and 4B depicts a root of directory trees for a hierarchical file system employed in the present invention.

The present invention provides an application programming interface (API), also called a "procedure", to aid in managing ACLs. The API includes four options: A (absolute)-ACLs override and replace all previous ACLs defined for descendant directories; U(union)-new ACL are OR'd with descendant directory ACLs; D(delete)-ACLs are removed; and N(non-intrusive)-ACLs are not added to any parent or children directories where the parent already has an ACL defined. The API is defined as follows: NetAccessCascade (char * TargetMachine, char * ParentDirectory, unsigned Options). The TargetMachine is the data processing system containing the files and directories whose ACLs are to be modified. The ParentDirectory is the directory from which the modifications are to begin, such as root directory tree 400. The unsigned Options are the operations that are to be performed on the parent directory and its subdirectories.

Referring now to FIG. 4A, a root directory tree 400 in a file system is depicted in accordance with a preferred embodiment of the present invention. Root directory tree 400 includes directories 402–414. In accordance with a preferred embodiment of the present invention, a user selects a target machine that contains files or directories in which the ACLs are to be modified. The parent directory is also selected by the user. The parent directory is the starting directory in which ACLs will be modified. Subdirectories under the parent directory may also be modified depending on the option or operation selected by the user.

Figure 4B:
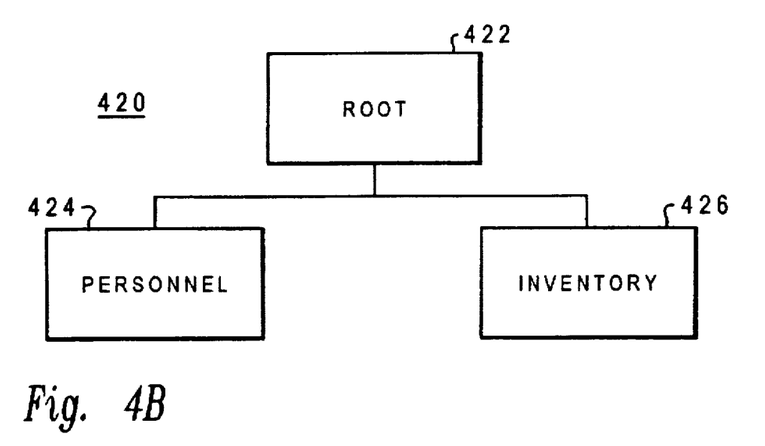

Referring now to FIG. 4B, a diagram of a hierarchical file system is depicted in accordance with a preferred embodiment of the present invention. Root directory tree 400 includes the following container objects (a directory and two subdirectories) in the depicted example: root 402, personnel 404, and inventory 406. Root 402 is the parent to the personnel 404 and inventory 406. Personnel 404 and inventory 406 are sibling container objects. In the depicted example, the ACL (not shown) provides a user read permission for root 402 and write permission for inventory 406. No permission is listed for the user in personnel 404. Various operations may be made to alter the access allowed to the user in accordance with a preferred embodiment of the present invention. If the user chooses a "delete" operation, the result is that the user has no permission to anything in the root directory tree. A "union" operation would result in the user having read permission to personnel 404 and read and write permission to inventory 406. A "non-intrusive" operation results in the user having read permission to personnel 404 and write permission to inventory 406 in the depicted example.

The example in FIG. 4B only includes two subdirectories under the selected parent directory route 422. The same operations may be applied to additional directories in the situation in which a subdirectory of the parent directory includes additional subdirectories. Also, although root 422 was selected as the parent directory, directories other than root 422 may be selected in accordance with a preferred embodiment of the present invention. The processes of the present invention are described in further detail in FIGS. 5 and 6 below.

Figure 5:
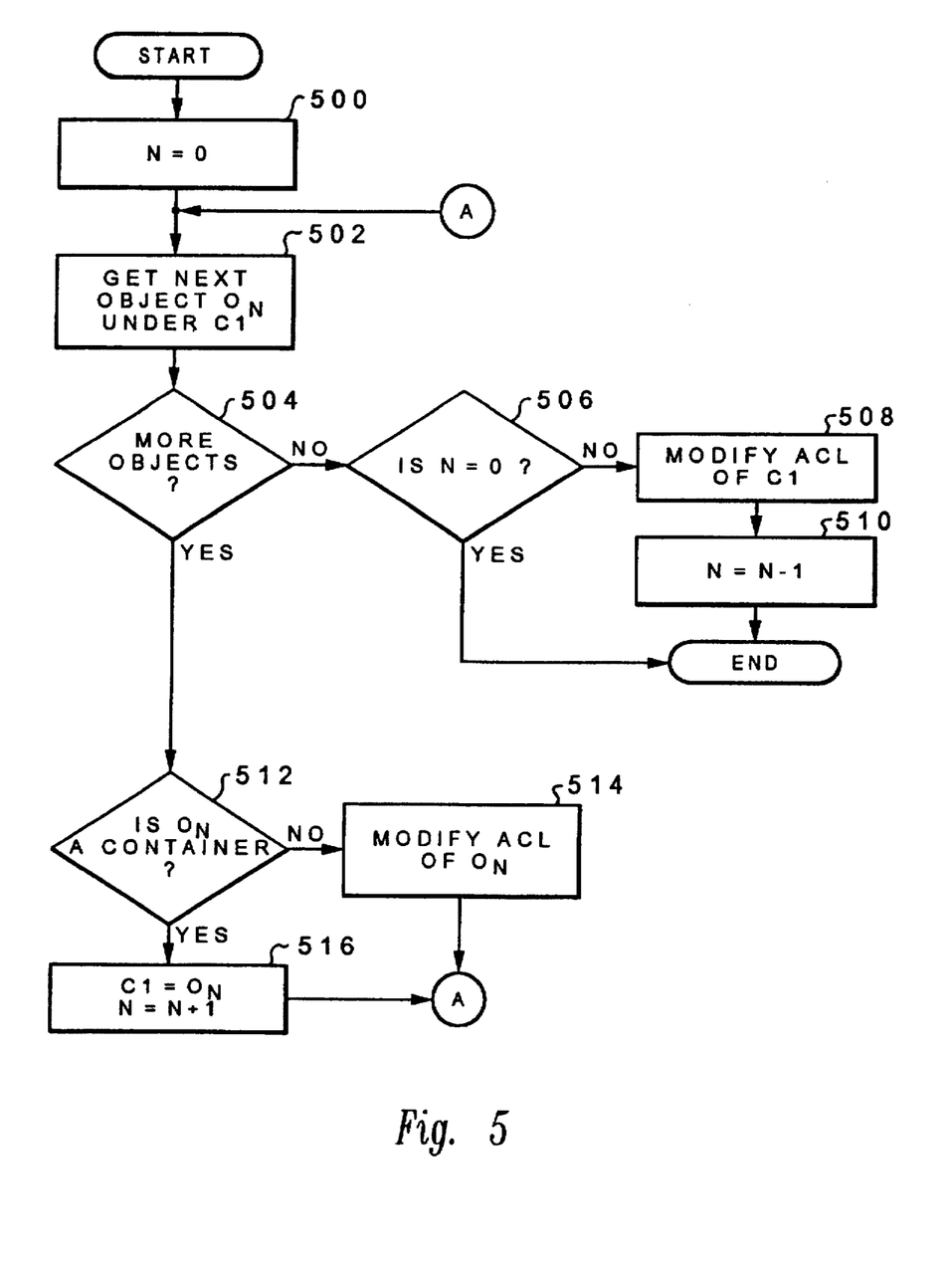
FIG. 5 is a flowchart of a process to modify ACLs for a container in accordance with a preferred embodiment of the present invention.

Referring now to FIG. 5, a flowchart of a recursive procedure to modify ACLs for a container object is depicted in accordance with a preferred embodiment of the present invention. The process begins by setting N equal to 0, as depicted in block 500. N represents the level of the directory tree. Initially, N is set equal to zero, which indicates that the level of the directory tree is that of the parent directory. The process then obtains the next object $O_N$ under container object C1, as illustrated in block 502. A determination is made as to whether more objects are present, as depicted in block 504. If no more objects are present, the process then determines whether N is equal to 0, as depicted in block 506. If N is not equal to 0, the process then modifies the ACL of container object C1, as illustrated in block 508. N is decremented by 1, as depicted in block 510, with the process terminating thereafter. Referring again to block 506, if N is equal to 0, the process also terminates.

Referring again to block 504, if more objects are present, a determination of whether object $O_N$ is a container object is made, as illustrated in block 512. If object $O_N$ is not a container object, the process modifies the ACL of $O_N$ as depicted in block 514. The process then returns to block 502, as described above. Referring back to block 512, if object $O_N$ is a container object, the process then sets C1 equal to $O_N$ and increments N by one, as depicted in block 516. The process then returns to block 502.

Figure 6:
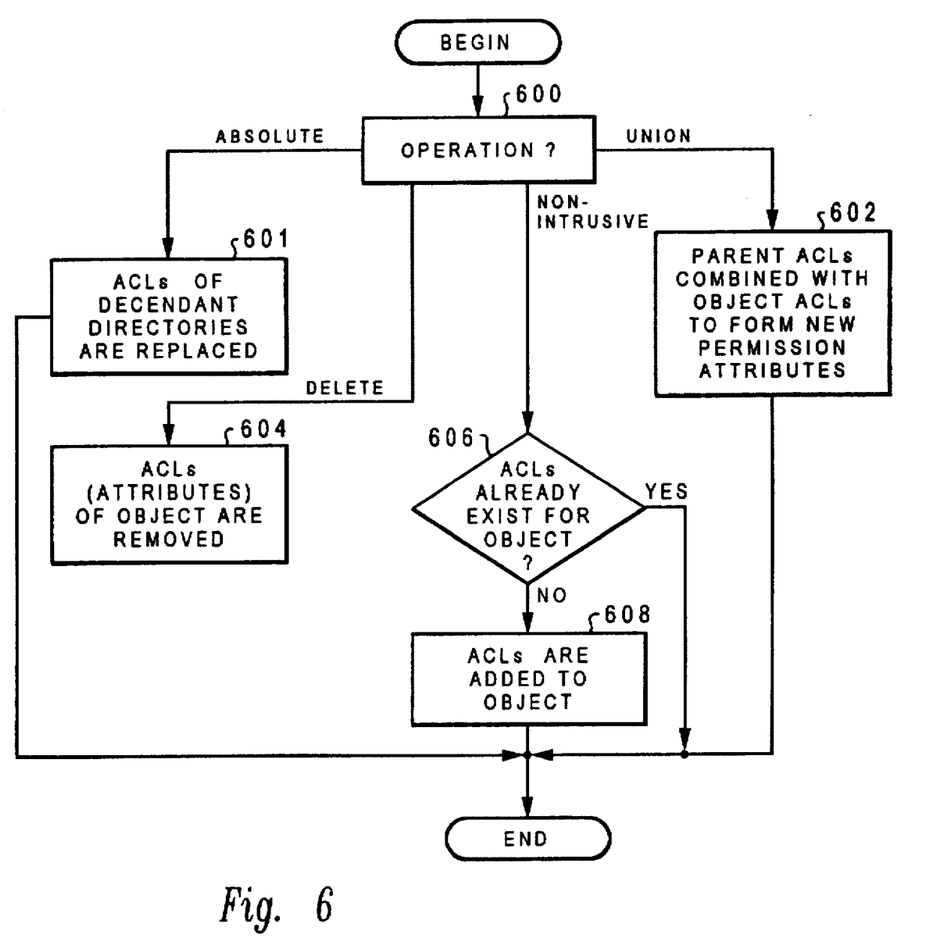
FIG. 6 is a more detailed flowchart of a process for modifying an ACL of an object or container from FIG. 5 in accordance with a preferred embodiment of the present invention.

Referring now to FIG. 6, a more detailed flowchart of a process for modifying an ACL of an object in blocks 512 and 516 from FIG. 5 is depicted. The process begins by determining the type of operation being performed on the container or object as illustrated in block 600. An operation may be selected by a user, such as a network administrator or a system operator, to alter the access that one or more users may have to various files and directories within a hierarchial file system. The user typically selects a target machine, which is the data processing system containing the directories or files in which access to the directories or files is to be modified. A parent directory also is selected. The parent directory is the reference point from which the changes to ACLs will begin as mentioned before in FIG. 3B. The user also selects the operation to be performed on the parent directories and its associated subdirectories.

If the operation is a "union" operation, the parent ACLs are combined with object ACLs to form new permission attributes, as illustrated in block 602. If the operation is a "delete" operation, the ACLs (attributes) of the object are removed, as depicted in block 604. A "non-intrusive" operation results in a determination of whether ACLs already exist for the object, as illustrated in block 606. If ACLs do not already exist for the object, the ACLs are added to the object, as depicted in block 608. Referring again to block 600, if the operation selected is an "absolute operation", all previous ACLs for defined descendent directories are replaced with the parent directory's ACL, as illustrated in block 610. Descendent directories are subdirectories of the parent directory.

The following is pseudo code for the recursive function from Figure:

```
Begin
    Get ACL of container object C1.
    If ACL does not exist,
        return.
    Get first object 'O1' in container object C1.
    if O1 is a container object
        Set C1 equal to O1.
        Call this recursive function.
    endif
    else
        Modify ACL of object O1.
    endelse
    if there are no objects under C1
        Modify ACL of C1.
        return;
    endif
    While there are objects under C1
        Get next object On.
        if object On is a container object
            Set C1 equal to On.
            Call this recursive function.
        endif
        else
            Modify ACL of On.
        endelse
    endwhile
End
```

The input passed to the recursive function in the pseudo code above is container object C1

The modification of an ACL of an object is illustrated in the pseudo code below:

```
Begin
    if the specified operation is 'union'
        Get ACLs of the input object.
        Merge ACLs of the input object with the ACLS
            of the container object C1.
        Set the merged ACLs on the input object.
    endif
    else
        if the operation is 'delete'
            Delete ACLs of the input object
        endif
        else
            if the operation is 'non-intrusive'
                if ACLs for the input object do not exist,
                    Add ACLs of container object C1 to input object.
                endif
            endif
        endelse
    endelse
End
```

While the invention has been particularly shown and described with reference to a preferred embodiment, it will be understood by those skilled in the art that various changes in form and detail may be made therein without departing from the spirit and scope of the invention.

We claim:

1. A method in a data processing system for managing access to a plurality of objects located on levels within a hierarchical structure, said method comprising:

locating a first object within said plurality of objects;

selecting an operation to alter an access attribute associated with said first object, wherein said selected operation normally excludes altering access attributes associated with objects located in said hierarchical structure on levels below said first object; and recursively performing said selected operation on subordinate objects located in said hierarchical structure on levels below said first object to alter access attributes associated with said subordinate objects, wherein access to said plurality of objects may be efficiently managed.

2. The method of claim 1, wherein said selecting step comprises selecting an union operation.

3. The method of claim 1, wherein said selecting step comprises selecting a non-intrusive operation.

4. The method of claim 1, wherein said selecting step comprises selecting a delete operation.

5. A method in a data processing system for managing access to a plurality of directories located on levels within a hierarchical structure, said method comprising:

locating a first directory within said plurality of directories;

selecting an operation to alter access to said first directory, wherein said selected operation normally excludes altering access to directories located in said hierarchical structure on levels below said first directory; and recursively performing said selected operation on subordinate directories located in said hierarchical structure on levels below said first directory to alter access to said subordinate directories, wherein access to said plurality of directories may be efficiently managed.

6. The method of claim 5, wherein said selecting step comprises selecting an union operation.

7. The method of claim 5, wherein said selecting step comprises selecting a non-intrusive operation.

8. The method of claim 5, wherein said selecting step selecting a delete operation.

9. A data processing system for managing access to a plurality of objects located in directories on levels within a hierarchical structure, said data processing system comprising:

location means for locating a first object within said plurality of objects wherein said first object is located in a first directory;

selection means for selecting an operation to alter access to said first directory, wherein said selected operation normally excludes altering access to directories located in said hierarchical structure on levels below said first directory; and execution means for recursively performing said selected operation on objects located in subordinate directories within said hierarchical structure on levels below said first to alter access to said subordinate, wherein access to said plurality of objects may be efficiently managed.

10. The data processing system of claim 9, wherein said selected operation is an union operation.

11. The data processing system of claim 9, wherein said selected operation is a non-intrusive operation.

12. The data processing system of claim 9, wherein said selected operation is a delete operation.

13. The data processing system of claim 9, wherein said plurality of objects is a plurality of directories.

14. The data processing system of claim 13 further comprising an access control list defining permissions for said plurality of directories.

15. The data processing system of claim 13 further comprising a plurality of access control lists, wherein a number of said plurality of directories is associated with a plurality of access control lists and said first directory is associated with a first access control list within said plurality of access control lists.

16. The data processing system of claim 15, wherein said selected operation prevents modification of said plurality of access control lists to prevent access to all directories located on levels below said first directory.

17. The data processing system of claim 15, wherein said selected operation combines said first access control list associated with said number of access control lists associated with each of said plurality of directories located on levels below said first directory to form modified access control lists.

18. A method of managing access to a plurality of objects within a hierarchical structure, comprising:

determining whether an object under a parent object is a container object;

responsive to determining that said object is not a container object, modifying an access control list associated with said object; and modifying an access control list associated with said parent object.

19. The method of claim 18, further comprising:

responsive to determining that said object is a container object, determining whether an additional object is under said object.

20. The method of claim 19, further comprising:

responsive to determining that said additional object is a not container object, modifying an access control list associated with said additional object; and modifying an access control list associated with said object.

21. The method of claim 20, further comprising:

responsive to determining that said additional object is a container object, determining whether a further object is under said additional object.

22. The method of claim 18, wherein the step of modifying an access control list associated with said parent object further comprises:

deleting an access attribute.

23. A method of managing access to a plurality of resources having a hierarchical structure in a data processing system, comprising:

associating an access control list with selected resources within said hierarchical structure of resources; and executing a procedure modifying a first access control list associated with a first resource within said hierarchical structure of resources and descendant access control lists associated with each descendant resource on a level within said hierarchical structure of resources below said first resource, wherein access control lists associated resources in said hierarchical structure may be efficiently managed.

24. The method of claim 23, wherein the step of associating an access control list with each resource within said hierarchical structure of resources further comprises:

associating an access control list with each directory within a hierarchical structure of directories.

25. The method of claim 23, wherein the step of executing a procedure further comprises:

executing an absolute procedure wherein said first access control list and said descendant access control lists are replaced.

26. The method of claim 23, wherein the step of executing a procedure further comprises:

executing a union procedure wherein access attributes within said first access control list and said descendant access control lists are combined with new access attributes.

27. The method of claim 23, wherein the step of executing a procedure further comprises:

executing a delete procedure wherein said first access control list and said descendant access control lists are removed.

28. The method of claim 23, wherein the step of executing a procedure further comprises:

executing a nonintrusive procedure wherein said first access control list and said descendant access control lists are left undisturbed if a defined access control list is associated with said first resource.

29. A method for managing access to a plurality of resources having a hierarchical structure in a data processing system, said method comprising:

instantiating an object for each resource within said plurality of resources;

selecting an operation to alter access to a first resource within said plurality of resources;

performing said selected operation on an object for said first resource; and performing said selected operation on objects for resources located in said hierarchical structure on levels below said first resource to alter access to said resources to match that of said first resource, wherein access to said plurality of resources may be efficiently managed.

30. The method of claim 29, wherein the step of instantiating an object for each resource within said plurality of resources further comprises:

instantiating an object for each file and directory within a hierarchical file system.

31. A data processing system having a hierarchical system of resources, comprising:

an object for each resource within said hierarchical system of resources;

means for altering an access attribute associated with an object for a first resource within said hierarchical system of resources;

means for automatically altering access attributes associated with objects for resources located in said hierarchical system of resources on levels below said first resource to match said access attribute associated with said object for said first resource, wherein access to said hierarchical system of resources may be efficiently managed.

32. The data processing system of claim 31, wherein said hierarchical system of resources comprises files and directories in a hierarchical file system.

* * * * *

UNITED STATES PATENT AND TRADEMARK OFFICE
CERTIFICATE OF CORRECTION

PATENT NO.  : 5,778,222
DATED       : July 7, 1998
INVENTOR(S) : Herrick et al.

It is certified that error appears in the above-identified patent and that said Letters Patent is hereby corrected as shown below:

Title page,
item [22] Filed: Please change "July 10, 1997" to --July 3, 1997--

In line 4 of the Abstract: Please change "after" to --alter--

Signed and Sealed this

Sixth Day of April, 1999

Attest:

Attesting Officer

Q. TODD DICKINSON

Acting Commissioner of Patents and Trademarks